April 9, 1963 T. H. STRATTON 3,084,469
FISHING SINKERS
Filed April 7, 1959
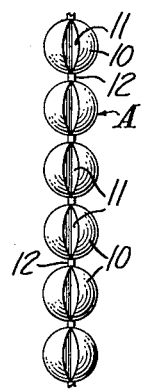
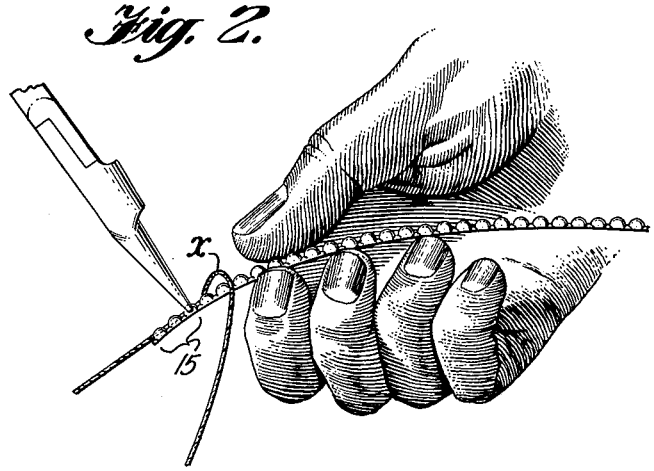
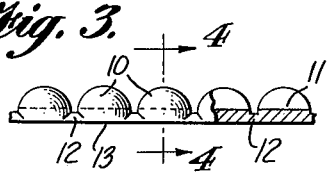
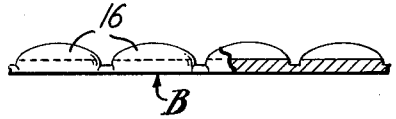
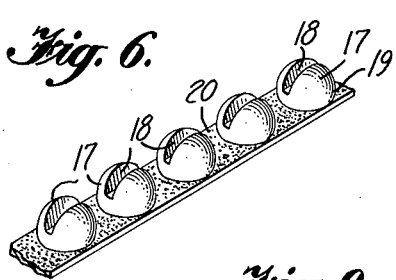
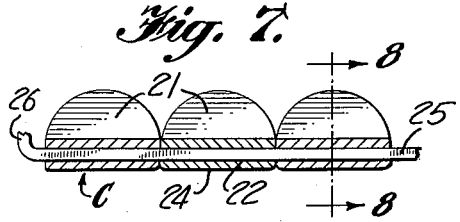
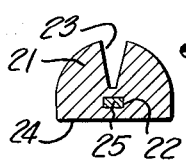
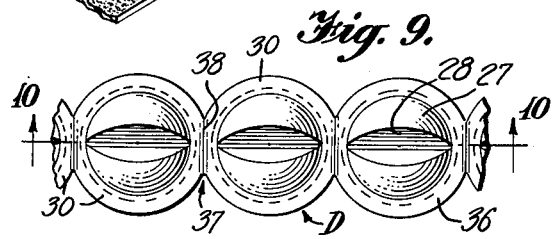
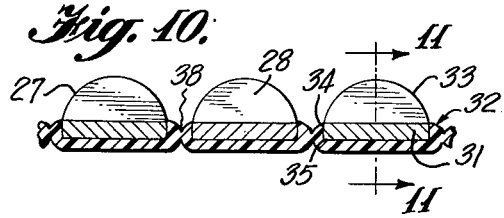
INVENTOR
Thomas H. Stratton
BY Mason, Fenwick & Lawrence
ATTORNEYS and *Patented Apr. 9, 1963*

3,084,469
FISHING SINKERS
Thomas H. Stratton, Box 454, State Farmers
Market, Columbia, S.C.
Filed Apr. 7, 1959, Ser. No. 804,704
5 Claims. (Cl. 43—43.14)

This invention relates to fishing sinkers, and more particularly to fishing sinkers comprising split shot weights which are attachable to a fishing line to provide a sinker of desired weight.

Split shot type fishing weights for forming sinkers are well known. These weights are small spheres of lead, having a radial groove in which the fishing line is placed and the sides of the groove are clamped together on the line by means of a pair of pliers. These weights provide a means for forming a sinker on a fishing line of a selected weight according to the conditions which the fisherman encounters. Thus, he may attach one, two, or a plurality of the split shots to his line, as required. Attachment of known types of split shot weights, however, is very time consuming. Since the weights are small and round, they are very difficult to hold in place on the line until they are clamped. This is particularly true when the line is wet and the fisherman's hands are wet, the weight will slip off the line, and usually several attempts to attach a weight are required before the weight is actually fastened on the line.

Consequently, it is an object of the present invention to provide a fishing sinker composed of one or more split shot weights which may be attached to a fishing line to provide a sinker, and which are provided with a means for holding the split shot weights while they are being clamped to the fishing line.

Another object of the present invention is to provide a fishing sinker of split shot weights, in which the holding means forms a permanent part of the sinker.

It is a further object of the present invention to provide a sinker made of split shot weights in which the holding means is removable from the split shot weights after the sinker is attached to the fishing line.

Other objects and advantages of the present invention will become apparent to those skilled in the art, from the following description read in conjunction with the accompanying drawing wherein:

FIGURE 1 is a plan view of a fishing sinker comprising a plurality of split shot weights joined together by integral connectors;

FIGURE 2 is a perspective view of a chain or thread of split shot weights of the present invention, in which a selected number of the weights are being attached to the line with pliers, the unused portion of the thread affording a holding means for attaching the selected number of weights to the line;

FIGURE 3 is a side elevation of the chain of split shot weights shown in FIGURE 1;

FIGURE 4 is a vertical cross-sectional view taken on the line 4—4 of FIGURE 3;

FIGURE 5 is a view similar to that of FIGURE 3, showing individual split shot weights of a different weight than that shown in FIGURE 3;

FIGURE 6 is a perspective view of a sinker made in accordance with the present invention, in which the split shot weights are mounted on an adhesive tape;

FIGURE 7 is a side elevation of a fishing sinker in accordance with the present invention, in which the split shot weights are strung bead-like on wire of rectilinear cross-section;

FIGURE 8 is a vertical cross-sectional view taken on the line 8—8 of FIGURE 7;

FIGURE 9 shows a fishing sinker in accordance with the present invention, in which the individual split shot weights are molded in a ribbon of stretchable plastic;

FIGURE 10 is a longitudinal sectional view of the sinker shown in FIGURE 9, taken on the line 10—10 of FIGURE 9; and FIGURE 11 is a vertical cross-sectional view taken on the line 11—11 of FIGURE 10.

Adverting now to the drawing, and more particularly to FIGURES 1 through 5, there are shown a plurality of globular or spherical split shot weights 10, which may be attached to a fishing line X, to form a sinker. Each of the weights 10 is provided with a groove or slit 11, to receive a fishing line. The weights 10 are made of lead or other suitable heavy metal, from which fishing sinkers may be made. A connector or bridge portion 12 connects the adjacent weights 10, and is cast integrally with the weights, to form a chain or thread A of split shot weights. The connectors 12 are substantially narrower than the weights 10, and are positioned just below the slit or groove 11, as viewed in FIGURE 4. The weights 10 have one side 13 which is flattened, and the other side 14 is substantially dome shape, the slit 11 being in the dome portion of the weight.

The fishing sinker of the present application may be sold in lengths of several feet or yards, and as best seen in FIGURE 2, the fisherman may apply the weights to his line by holding a length of the weights so that the number of weights which he desires to use for his sinker 15, for example, extend beyond his hand. If he desires to add three weights, for instance, the line is placed so that it extends through the splits of the outer three weights. It is then fastened fast in the third weight from the end by pinching the sides of the weight to bring the split together on the line. Then the first two weights are attached in the same manner, and the three weights are severed from the chain of weights by flexing the connector portion between the third and fourth weights until it breaks. The flat surface of the weights 10 prevents the chain of weights from turning in the hand as the pliers are manipulated to clamp the weights to the fishing line, and the chain in which the weights are cast provide a holding means for the sinker portion while it is being attached to the fishing line.

All the weights in a chain are of the same size, shape and weight, so that the fisherman can estimate how many of the weights 10 are needed for the particular fishing conditions. However, the weights of the present invention may be furnished in varying sizes, but the size of all weights on a single chain are identical. As seen in FIGURE 5, weights 16 which are approximately twice as large as those seen in FIGURE 3, may be provided on a chain B. Thus, two of the weights 16 may be applied to a fishing line, and one from the chain A to provide a selective range of weights.

A modified form of the invention is shown in FIGURE 6. In this form of the invention a plurality of split shot weights 17 having a slit or groove 18 and a plane face 19 are adhered to a strip 20. The strip 20 may be of gummed paper tape, or it may be made of one of the synthetic resin plastics. The split shot weights are spaced longitudinally of the tape, and after the fishing line has been attached to the selected number of weights 17, they may then be stripped from the tape. The tape 20 provides a means for holding and positioning the weights while they are being attached to the fishing line.

The modification shown in FIGURES 7 and 8 has weights 21 which are similar to the weights 17, with the exception that they have a rectilinear shaped aperture 22 which extends parallel with the groove 23 between the bottom of the groove 23 and the flat bottom 24 of the weight. The weights 21 are then strung bead-like on a rectilinear shaped wire 25. The cross-sectional shape of the wire 25 corresponds substantially with the cross-sectional shape of the aperture 22. To attach the split weights 21 to the fishing line, the line is placed in the grooves of the weights, as previously described, and clamped thereon with pliers. The outer end 26 of the wire 25 is then snipped off and the attached weights are slid from the wire, and the end of the wire is then turned at an angle to the aperture 22 of the outermost of the remaining weights 21, to act as a retainer for the chain of weights C. The cross-sectional shape of the wire 25 prevents the weights from turning when they are clamped to the fishing line.

In the modification of the invention shown in FIGURES 9, 10 and 11, the split weights 27 having a groove 28 and a plane surface 29 are molded in a plastic strip 30. The strip 30 has a substantial thickness, so that in molding, the portion 31 of the weight 27 which is submerged in the plastic strip is surrounded by a rim 32 which securely holds the base edge of the weight. In this case the dome shape 33 is substantially hemispherical, so that the top 34 of the rim 32 is of smaller diameter than the base 35 of said rim, to provide socket sections 36. The socket sections 36 are joined to each other at a narrowed portion 37. This narrowed portion 37 is provided with a line of weakness 38, to enable severing of the socket sections when desired.

To apply the weight 27 to the fishing line, the line is placed in the groove 28 and the weights are clamped on the line, as previously described in the embodiment shown in FIGURE 1. When the weights are clamped on the line, the socket of the innermost attached weight is torn along the line of weakness 38 from the remaining sockets of the chain D and then the sockets 36 are stripped from the weights attached to the line, to form the sinker. The strip 30 prevents turning of the split weights 27 during attachment of the weights to the fishing line.

The modifications of the invention shown in FIGURES 6 through 11 have similar size and shape weights on a single chain. However, chains having different sizes of weights on each chain are contemplated to make up a sinker of desired weight. All of the means for holding the split shot weights in a chain or thread permit the weights forming a sinker to be severed from the chain after the weights have been attached to the fishing line.

While there has been disclosed in the foregoing description a practical embodiment of the sinkers for fishing lines, in accordance with the present invention, it will be understood by those skilled in the art that variations in the implementation of the concept of the invention are within the purview and scope of the invention.

What is claimed is:
1. Means for providing fishing line sinkers of split shot weights to be clamped to a fishing line with a hand tool while the line and sinker means are being held in one hand comprising, a plurality of body portions each similar in size and weight having a line receiving longitudinal groove extending inwardly from the surface, a portion of the surface of each body portion diametrically opposite from said groove being planar, an elongated strip of material, adhesive means joining said planar surfaces of said body portions to said strip in spaced apart relation longitudinally thereof, said grooves being in longitudinal alignment, and said strip of material providing a means for holding said sinker means against rotation about its longitudinal axis during attachment of the sinker to the line.

2. Means for providing fishing line sinkers of split shot weights to be clamped to a fishing line with a hand tool while the line and sinker means are being held in one hand comprising, a plurality of body portions similar in size and weight, each of said body portions having a line receiving longitudinally aligned groove extending inwardly from the surface, said groove having a bottom lying deeply within said body portion, a portion of the surface of said body portion diametrically opposite from said groove being flattened so that it may be held against rotation about its longitudinal axis during attachment of the sinker to the line, a connector between adjacent body portions for holding said plurality of body portions in a continuous thread with all of said grooves in longitudinal alignment, said connector extending from substantially adjacent said flattened portion of the surface to a point below the bottom of said groove, said connector providing a weakened area for severing at will a selected number of said body portions after attachment to said line.

3. Means for providing fishing line sinkers of split shot weights to be clamped to a fishing line with a hand tool while the line and sinker means are being held in one hand comprising, a plurality of body portions similar in size and weight having a flattened portion and having longitudinally aligned slits extending inwardly from the periphery of each of said body portions to receive a fishing line, said flattened portion being diametrically opposite from said slits, said slits having a bottom lying deeply within each said body portion, connector portions joining adjacent body portions to form a thread of fishing weights, said connector portions being of substantially less cross-section than said body portions and extending from substantially adjacent said flattened portion to a point below the bottom of said slit, whereby a fishing sinker of more than one of said body portions may be broken from said thread of fishing weights.

4. The construction of claim 2 wherein the connector includes a socket for each adjacent body portion, said socket being complementary to said body portion to hold and seat said body portion therein.

5. The construction of claim 3 wherein each of said body portions is provided with an aligned aperture, said apertures together receiving said connector portions therethrough.

References Cited in the file of this patent
UNITED STATES PATENTS

| | | |
|---|---|---|
| 1,023,676 | Pancoast | Apr. 16, 1912 |
| 1,710,393 | Williams | Apr. 23, 1929 |
| 2,594,093 | Thompson | Apr. 22, 1952 |
| 2,815,124 | Pellier | Dec. 3, 1957 |
| 2,904,924 | Tashiro | Sept. 22, 1959 |

FOREIGN PATENTS

| | | |
|---|---|---|
| 467,394 | Germany | June 29, 1927 |